United States Patent [19]

Pevzner

[11] Patent Number: 5,520,000
[45] Date of Patent: May 28, 1996

[54] CRYOGENIC GAS COMPRESSION SYSTEM

[75] Inventor: Boris Pevzner, Amherst, N.Y.

[73] Assignee: Praxair Technology, Inc., Danbury, Conn.

[21] Appl. No.: 413,819

[22] Filed: Mar. 30, 1995

[51] Int. Cl.$^6$ .................................. F17C 7/04; F17C 9/02
[52] U.S. Cl. .............................. 62/48.1; 62/50.1
[58] Field of Search .......................... 62/48.1, 50.1

[56] References Cited

U.S. PATENT DOCUMENTS

| | | | |
|---|---|---|---|
| 3,387,462 | 6/1968 | Bauger et al. | 62/48.1 |
| 4,015,436 | 4/1977 | Seki | 62/48.1 |
| 4,570,578 | 2/1986 | Peschka et al. | 62/48.1 |
| 4,961,325 | 10/1990 | Halvorson et al. | 62/48.1 |
| 5,218,827 | 6/1993 | Pevzner | 62/50.6 |
| 5,228,295 | 7/1993 | Gustafson | 62/50.1 |
| 5,243,821 | 9/1993 | Schuck et al. | 62/50.6 |

OTHER PUBLICATIONS

Maximizing Customer Productivity Using Next Generation Liquid Hydrogen Pump Technology, Air Products, 1992.

*Primary Examiner*—Ronald C. Capossela
*Attorney, Agent, or Firm*—Stanley Ktorides

[57] ABSTRACT

A cryogenic gas compression system including a storage container and a gas/liquid mixer coupled to the storage container which employs a controlled flow of cryogenic liquid from the storage container to provide gas cooling action, and compressor for compressing the output gas to a high pressure. A sensor provides an indication of the gas entering the compressor and feeds it to a controller which controls the quantity of liquid cryogen fed from the storage container to the mixer.

10 Claims, 2 Drawing Sheets

5,520,000

CRYOGENIC GAS COMPRESSION SYSTEM

FIELD OF THE INVENTION

This invention relates to gas compression systems and, more particularly, to a system for extracting and compressing gas from a cryogenic gas source to a high pressure, while maintaining the gas at a low temperature and minimizing vaporization losses.

BACKGROUND OF THE INVENTION

Transportation and storage of industrial gases such as hydrogen and nitrogen take place with the gas in the form a liquid, the liquefied gas being referred to as a cryogen. Presently, liquid hydrogen is pumped from a storage tank (at 80 to 140 psia) to receivers or tube trailers which store the gas at 2000 to 3000 psia. Such pumping action employs reciprocating pumps which, themselves, cause substantial losses of the pumped cryogen through vaporization. Further, pressure build-ups can result from vaporization of the stored liquid or from vaporization gases from liquid product used to cool the piping and pump prior to pump start up and during operation. Such a pressure build-up can cause a storage tank to exceed its maximum allowable working pressure. In such case, the gas must be vented to the atmosphere and wasted. The benefit which results from the pumping of hydrogen in the liquid state is that the pumping equipment inherently exhibits small displacements and thus equipment size and power requirements are minimized. However, gas vaporization losses offset equipment savings.

U.S. Pat. No. 5,218,827 to Pevzner describes a liquefied gas pumping system wherein a cooling sump is employed. The system design speeds up pump priming, reduces piping heat leakage and eliminates a need for boiling off of the gas to build up tank pressure to compensate for liquid subcooling losses.

U.S. Pat. No. 5,243,821 to Schuck et al. describes a gas delivery system which is designed to provide a supply of gas in a quantity matched to a user's rate of gas consumption. The Schuck et al. system includes a pump/compressor which is adapted to utilize either a vaporized cryogen, a mixture of liquid cryogen and vaporized cryogen, or a subcooled fluid. By varying the gas/liquid composition of the input to the pump/compressor the mass flow rate of the pump/compressor is controlled over a wide range so as to enable a variable gas output feed. Flow control is achieved by the aforementioned varying of the input density of fluids to the pump/compressor through selective feeding of either gas or liquid, or a combination thereof. Control of the mix of gas/liquid fed to the pump/compressor is based upon a comparison of tank discharge pressure versus use pressure; usage demand flow; and temperature at the compression end of the pump/compressor. The Schuck et al. system is specifically designed to provide a variable flow rate of product in accordance with use demands. No attempt is made by Schuck et al. to maximize the output flow rate of gaseous product.

Prior art gas compressors have employed both single and multistage reciprocating compressors to achieve desired levels of gas compression. Input gas flow to the compressors was at ambient temperature, and individual compression stages caused a substantial temperature rise of the compressed gaseous product. As a result, intercoolers and/or aftercoolers were required to assure that gas entering the receivers or tube trailer was substantially at ambient temperature. Such systems required substantial energy inputs to achieve the desired levels of intercooling of the gaseous product.

Accordingly, it is an object of this invention to provide an improved cryogenic gas compression system wherein input gas flow to the compressor is at cryogenic temperature. This results in a maximum output rate for a given first stage displacement.

It is another object of this invention to provide an improved cryogenic gas compression system wherein compressor intercooling facilities are unnecessary.

It is yet another object of this invention to provide a cryogenic gas compression system wherein the compression apparatus operates only upon gaseous product, and boil-off losses are avoided.

SUMMARY OF THE INVENTION

A system delivers a gas to an output point at a high pressure in the range of 500–6000 pounds per square inch absolute (psia), depending on the temperature of the inlet gas and the gas compression ratio. Since the objective is to maximize the compressor output, the temperature of the gas entering the compressor is kept at as low a temperature as possible and the compressed gas exit temperature is allowed to vary so long as it is below a maximum allowable temperature. The system includes a storage container for storing a cryogen both as a liquid and as a gas at a first pressure level. A gas/liquid mixer is coupled to the storage container and receives gas from the storage container and maintains the gas at a first low temperature that is slightly in excess of the vapor pressure of the gas at the first pressure level. The gas/liquid mixer employs a controlled flow of cryogenic liquid from the storage container to provide the gas cooling action. A compressor compresses the output gas from the gas/liquid mixer to a high pressure. A temperature sensor provides a temperature indication of the gas entering the compressor and feeds it to a controller which controls the quantity of liquid cryogen fed from the storage container to the gas/liquid mixer. The controller is responsive to the output from the temperature sensor to alter the quantity of liquid cryogen so as to adjust the first low temperature of the gas to a temperature slightly above the gas saturation point. This allows a maximization of the gas flow rate for a given compressor displacement.

DETAILED DESCRIPTION OF THE INVENTION

Figure 1:
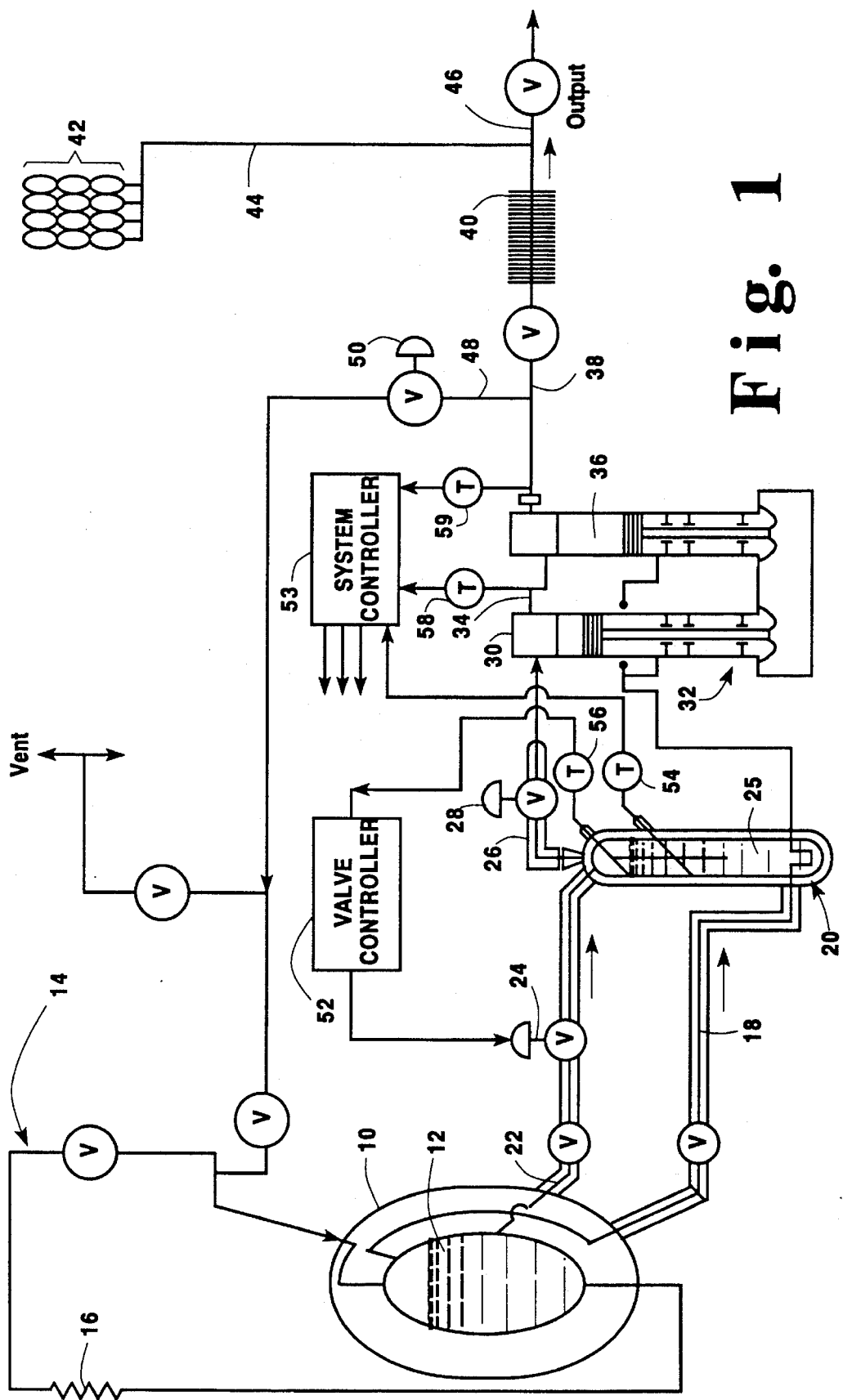
FIG. 1 is a schematic representation of an apparatus embodying the invention.

Referring now to FIG. 1, a cryogen storage container 10 contains a supply of cryogen 12. Hereafter, it will be assumed that cryogen 12 is liquid hydrogen; however it will be understood by those skilled in the art that the invention is equally applicable to other cryogens (e.g. nitrogen). Storage container 10 is provided with a recirculating pathway 14 which enables liquid cryogen to be recirculated through a pressure building coil 16 to maintain the internal pressure within container 10 at a specified level. The liquid/gas states are maintained at or below an "equilibrium vapor pressure" which hereafter refers to a state wherein a gas is in equilibrium with its liquid state. A gaseous hydrogen outlet conduit 18 feeds gas to a lower portion of a gas/liquid mixer 20. A liquid hydrogen outlet conduit 22 feeds liquid hydrogen through a control valve 24 to an upper portion of gas/liquid mixer 20. A porous packing 25 enables gas entering, via conduit 18, into gas/liquid mixer 20 to percolate upwardly to an outlet conduit 26. Thus, the gas passes through an isolation valve 28 and into a first stage 30 of a two stage compressor 32. Compressed gas exits from first stage compressor 30, via conduit 34, to a second stage compressor 36. A conduit 38 feeds the resulting compressed hydrogen gas through an auxiliary heater/cooler 40 and thence to a plurality of gas receivers 42 via conduit 44. Product gas output is taken via output conduit 46. Lastly, an unloading conduit 48 enables compressed gas to be passed back to storage container 10 via an unloading valve 50.

Valve controller 52 provides control of the gas temperature in the mixer 20 and therefore at the inlet of the first stage 30 of the compressor 32, see FIG. 1. It receives the temperature (or pressure) value from sensor 56 in gas/liquid mixer 20. Sensor 56 is a vapor pressure bulb which provides an input to valve controller 52 that is indicative of hydrogen gas temperature as it percolates up through packing 25. Sensor 54 is preferably a helium thermometer which provides an actual hydrogen gas temperature reading in the mixer 20. The sensor/thermometer 54 is equipped with a two points temperature switch indicating (i) that temperature of the gas is above the maximum allowable gas temperature and therefore the system is to be primed (cooled down) or (ii) the temperature in the mixer has dropped below the minimum allowable gas temperature and that this liquid should not be allowed to flow into mixer 20.

In operation, hydrogen gas that is introduced to gas/liquid mixer 20 via conduit 18 percolates upwardly through packing 25. When the gas temperature at the top of gas/liquid mixer 20 exceeds a setting temperature (defined by the setting of vapor pressure bulb sensor 56), controller 52 causes valve 24 to open so as to enable liquid hydrogen to pass through conduit 22 and into gas/liquid mixer 20. The liquid hydrogen percolates downwardly through packing 25 and cools the upwardly percolating hydrogen gas to a level that is just in excess of the vapor pressure of the gas at the pressure within gas/liquid mixer 20. When the temperature of the gas is reduced to near its equilibrium (vapor) temperature, controller 52 operates valve 24 to reduce the flow of liquid hydrogen into gas/liquid mixer 20.

Hydrogen gas which enters manifold 26 passes to first stage compressor 30 where it is compressed to an intermediate pressure. During compression actions, a quantum of heat is added to the compressed gas, substantially raising its temperature from the near liquid temperature the hydrogen gas exhibits when it enters conduit 26. The temperature of the gas exiting from first stage compressor 30 is sensed by temperature sensor 58, whose output is used to indicate non-nominal conditions within a first stage compressor 30 for control purposes. The output from sensor 58 can be used, instead of sensor 56, to sense the gas temperature for control of the liquid hydrogen input to gas/liquid mixer 20. In such case the discharge temperature after the first stage would be set to −300° F.

The intermediately compressed gas enters second stage compressor 36 where it is compressed to its ultimate discharge pressure and exits via conduit 38. If necessary, a cooler/heater 40 can be provided to provide adjustment of the output gas temperature. The output gas is stored in receivers 42 or, may be directly provided to the user via output conduit 46.

System controller 53 employs temperature indications from sensors 54, 58, and 59 to avoid several undesirable events and for initiation of emergency shut-down. If the temperature of the hydrogen gas in the upper region of gas/liquid mixer 20 drops to a range where there is a possibility of liquid entering conduit 26, system controller 53 operates to shut valve 24 to prevent further liquid flow therethrough. If liquid is allowed to flow into compressor 32, significant damage will occur due to the large pressure changes which result from the conversion of the liquid to the gaseous phase. An excessive temperature output from sensor 54 causes system controller 53 to shut down compressor 32 or to open unloading valve 50 to allow for system priming. If the gas temperature exiting from second stage compressor 36 is above a specified limit, excessive compressor piston ring wear or premature piston ring failure will occur. An excessive temperature output from sensor 59 will cause system controller 53 to shut down compressor 32 or to open unloading valve 50.

To provide an example of operation of the system of FIG. 1, it is assumed that cryogenic storage container 10 stores liquid hydrogen at −420° F., at approximately 80 psia. Gaseous hydrogen entering gas/liquid mixer 20 via conduit 18 could be at a temperature of approximately −320° F. Operation of control valve 24 by valve controller 52 will enable liquid hydrogen at −410° F. to percolate downwardly through packing 25 in gas/liquid mixer 20. Appropriate control over valve 24 enables the hydrogen gas entering conduit 26 to exhibit a temperature of about −400° F. At such temperature, the hydrogen gas is highly dense, thus enabling relatively small size compressor apparatus to be used for the two stages of compression. The hydrogen gas entering first compression stage 30 at −400° F. (and at 80 psia) exits therefrom at a pressure of approximately 700 psia and at approximately −200° F. Second compression stage 36 further compresses the hydrogen to 2600 psia and causes a rise in gas temperature from −200° F. to −100° F. Further temperature treatment through heater/cooler 40 may be required of this very cold gas prior to its storage in receiver 42 at high pressure to bring it to a desired temperature of about −20° F.

It can thus be seen that by controlling the input temperature of the hydrogen gas to compressors 32 to be just in excess of its equilibrium vapor pressure, the quantum of heat added during the compression stages which raises the temperature of the gas is controlled to be below the allowable temperature for the piston rings. The heat of compression arises from the adiabatic work done on the gas in being compressed from the inlet pressure to the compressor outlet pressure and it manifests itself through a temperature rise in the gas. Negligible heat flow with the ambient is assumed in the process. In such manner, the prior art requirement of providing intercoolers between stages of compression is avoided and compressed product gas at ambient or below ambient temperature is achieved. Controller 52 is thus set to adjust valve 24 in a manner to assure that the hydrogen gas input temperature to conduit 26 is such that the mass flow of the gas is maximized.

Figure 2:
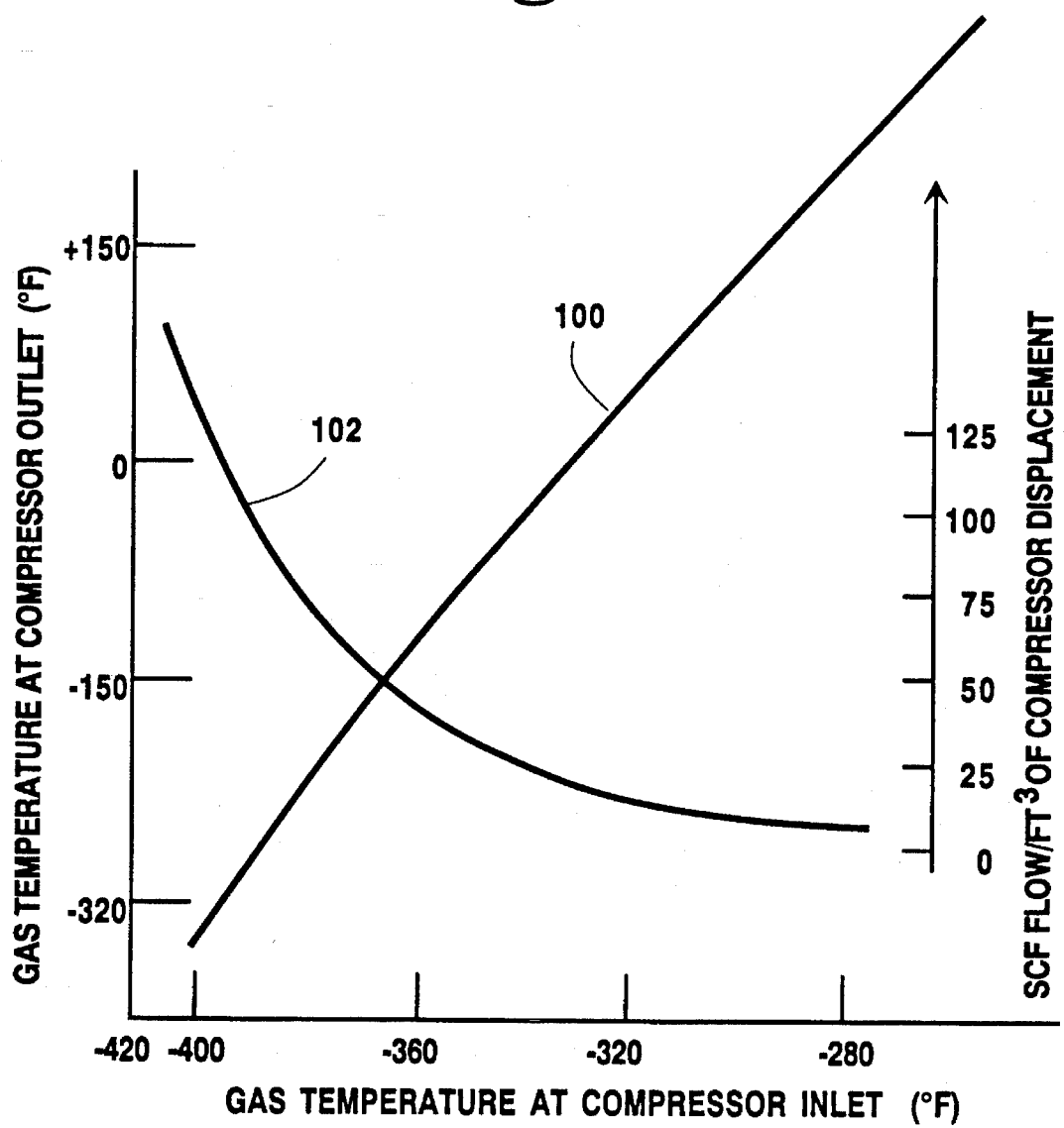
FIG. 2 is a plot of variations in compression gas outlet temperature and flow, versus changes in gas inlet temperature.

FIG. 2 is a plot of gas temperature at outlet conduit 38 versus the gas temperature at inlet conduit 26, for an inlet pressure of 115 psia and a discharge pressure of 2615 psia. Note, as shown by curve 100, that there is a substantially linear relationship between the two plotted gas temperature values. However, when gas temperature at inlet conduit 26 is plotted against flow per cubic foot of compressor displacement, curve 102 shows a significant increase in compressor output gas flow with lower gas inlet temperatures. In fact, below 320° F. there is a substantially nonlinear relationship between gas temperature and cubic flow output from compressor 32. Thus, if the gas inlet temperature is maintained at −400° F., the output flow rate is three times greater than that experienced at −360° F.

FIG. 2 thus illustrates the value of maintaining the hydrogen gas inlet temperature to compressor 32 at a level as near as possible to the vapor pressure of the gas. Importantly, the temperature of the inlet gas must not be allowed to fall below the vapor pressure which will enable liquid to be fed to compressor 32.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for delivering a gas to an output point at a high pressure, said system comprising:

a storage container for storing a cryogen at a first pressure as both a liquid and a gas;

mixing means coupled to said storage container for receiving said gas from said storage container and for maintaining a temperature of said gas at a first low temperature which at said first pressure, causes said gas to be close to its equilibrium vapor pressure;

a flow path coupling said mixing means to said output point;

compressor means positioned in said flow path for compressing said gas to a high pressure;

temperature sensing means in said flow path; and control means for feeding a quantity of cooling liquid to said mixing means in response to a temperature output from said temperature sensing means, said quantity of cooling liquid controlled by said control means to adjust said temperature of said gas to said first low temperature.

2. The system as recited in claim 1 wherein said control means causes said mixing means to draw said quantity of said cooling liquid from said storage container.

3. The system as recited in claim 2, wherein said mixing means has upper and lower regions and comprises a chamber having a gas inlet in said lower region for receiving said gas from said storage container and a liquid inlet in said upper region for receiving said cooling liquid, whereby said cooling liquid and gas flow in opposite directions within said mixing means to achieve a cooling action.

4. The system as recited in claim 1 wherein said temperature means senses a temperature of gas that flows between said mixing means and said compressor means.

5. The system as recited in claim 1 wherein said cryogen is hydrogen.

6. The system as recited in claim 1 wherein said compressor means comprises a dual stage gas compressor.

7. The system as recited in claim 1, wherein said control means operates said mixing means in a continuous manner so as to assure a constant maximum gas output from said compressor means.

8. A method for delivering a gas to an output point at a high pressure, said method comprising the steps of:

(a) storing a cryogen at a first pressure as both a liquid and a gas;

(b) mixing said gas with liquid cryogen to maintain a temperature of said gas at a first low temperature which, at said first pressure, causes said gas to be close to its equilibrium vapor pressure;

(c) compressing said gas from said first pressure and first low temperature to a high pressure; and (d) controlling said mixing step (b) in response to a sensed gas temperature to alter a quantity of said liquid cryogen so as to adjust said temperature of said gas to said first low temperature.

9. The method as recited in claim 8 wherein said mixing step (b) draws said quantity of said liquid cryogen from a storage container which also stores said gas.

10. The method as recited in claim 8 wherein said controlling step (d) responds to a temperature of gas that is sensed immediately prior to said compressing step (c).

* * * * *